(12) United States Patent
Droux et al.

(10) Patent No.: US 7,616,653 B1
(45) Date of Patent: Nov. 10, 2009

(54) NETWORK INTERFACE CARD AGGREGATION FRAMEWORK

(75) Inventors: Nicolas G. Droux, San Jose, CA (US); Sunay Tripathi, San Jose, CA (US); Paul Durrant, Slough (GB)

(73) Assignee: Sun Microsystems, Inc., Santa Clara, CA (US)

( * ) Notice: Subject to any disclaimer, the term of this patent is extended or adjusted under 35 U.S.C. 154(b) by 743 days.

(21) Appl. No.: 10/932,978

(22) Filed: Sep. 2, 2004

(51) Int. Cl.
*H04L 12/56* (2006.01)

(52) U.S. Cl. .................................. 370/420; 370/423

(58) Field of Classification Search ................. 370/401, 370/402, 403, 419, 420, 421
See application file for complete search history.

(56) References Cited

U.S. PATENT DOCUMENTS

| | | | |
|---|---|---|---|
| 5,852,630 A * | 12/1998 | Langberg et al. | 375/219 |
| 5,864,535 A * | 1/1999 | Basilico | 370/231 |
| 5,918,021 A * | 6/1999 | Aditya | 709/235 |
| 6,052,733 A * | 4/2000 | Mahalingam et al. | 709/235 |
| 6,567,377 B1 * | 5/2003 | Vepa et al. | 370/230 |
| 6,590,861 B1 * | 7/2003 | Vepa et al. | 370/216 |
| 6,804,233 B1 * | 10/2004 | Congdon et al. | 370/389 |

OTHER PUBLICATIONS

"Sun Trunking 1.2"; Sun Microsystems, Inc.; 1999 (18 pgs.).

* cited by examiner

*Primary Examiner*—Jayanti K Patel
*Assistant Examiner*—Bo Hui A Zhu
(74) *Attorney, Agent, or Firm*—Osha • Liang LLP (57) ABSTRACT

In general, in one aspect, the invention relates to a network interface card (NIC) aggregation framework, including a plurality of providers each configured to publish at least one port, a MAC client configured to send a packet to the at least one port, and a media access control (MAC) service module configured to map the at least one port to one of the plurality of providers, wherein the MAC service module comprises a client interface configured to interface with the MAC client and a provider interface configured to interface with each of the plurality of providers.

18 Claims, 4 Drawing Sheets

NETWORK INTERFACE CARD AGGREGATION FRAMEWORK

BACKGROUND

Network traffic is transmitted from a network (e.g., a local area network (LAN), a wide-area network (WAN), the Internet, etc.), from a sending system (e.g., a computer system) to a receiving system (e.g., a computer system) via a network interface card (NIC). The NIC is a piece of hardware found in a typical computer system that includes functionality to send and receive network traffic. Typically, network traffic is transmitted in the form of packets, where each packet includes a header and a payload. The header contains information regarding the source address, destination address, size, transport protocol used to transmit the packet, and various other identification information associated with the packet of data. The payload contains the actual data to be transmitted from the network to the receiving system.

Some sending and receiving systems include a single NIC, while other sending and receiving systems include multiple NICs. When multiple NICs are present on the system, one or more NICs may be grouped to form an aggregation group. The sending and receiving systems that include aggregation groups typically have higher packet throughput due to the higher availability of NICs through which packets may be sent and received. More specifically, the aggregation group is utilized by the systems (i.e., sending and receiving systems) via a virtual NIC.

Thus, when a client (i.e., a process configured to send and/or receive a packet) attempts to send a packet to a receiving system, the client sends the packet to the virtual NIC (which appears to the client as an actual NIC). A link aggregation module within the system receives the packet and then determines which of the multiple NICs within the aggregation group to use to service the packet (i.e., send the packet to receiving system). The link aggregation module subsequently forwards the request to the appropriate NIC in the aggregation group. The NIC subsequently services the packet.

SUMMARY

In general, in one aspect, the invention relates to a network interface card (NIC) aggregation framework, comprising a plurality of providers each configured to publish at least one port, a MAC client configured to send a packet to the at least one port, and a media access control (MAC) service module configured to map the at least one port to one of the plurality of providers, wherein the MAC service module comprises a client interface configured to interface with the MAC client and a provider interface configured to interface with each of the plurality of providers.

In general, in one aspect, the invention relates to a method for sending a packet, comprising receiving the packet from a Media Access Control (MAC) client, determining a port to send the packet to using the MAC service module, if the port is a virtual port forwarding the packet to a link aggregation control software, choosing a hardware port associated with a Network Interface Card (NIC) to process the packet, wherein the NIC is associated with an aggregation group, forwarding the packet to the hardware port associated with the NIC using the MAC service module, wherein the packet is forwarded to the MAC service module through a client interface associated with the MAC service module, and if the port is a hardware port forwarding the packet to the hardware port associated with the NIC through a provider interface associated with the MAC service module.

In general, in one aspect, the invention relates to a method for receiving a packet comprising receiving the packet from a Network Interface Card (NIC), determining a Media Access Control (MAC) client to forward the packet to, if the MAC client is a link aggregation control software, forwarding the packet to the link aggregation control software through a client interface associated a MAC service module, forwarding the packet to the MAC service module from the link aggregation control software to the MAC service module through a provider interface associated with the MAC service module, determining the MAC client to forward the packets to, wherein the MAC client is not the link aggregation control software, and forwarding the packet to the MAC client if the MAC client is not link aggregation control software.

In general, in one aspect, the invention relates to a computer system for sending a packet, comprising a processor, a memory, a storage device, and software instructions stored in the memory for enabling the computer system under control of the processor, to receive the packet from a Media Access Control (MAC) client, determine a port to send the packet to using the MAC service module, if the port is a virtual port forward the packet to a link aggregation control software, choose a hardware port associated with a Network Interface Card (NIC) to process the packet, wherein the NIC is associated with an aggregation group, forward the packet to the hardware port associated with the NIC using the MAC service module, wherein the packet is forwarded to the MAC service module through a client interface associated with the MAC service module, and if the port is a hardware port forward the packet to the hardware port associated with the NIC through a provider interface associated with the MAC service module.

In general, in one aspect, the invention relates to a computer system for receiving a packet, comprising a processor, a memory, a storage device, and software instructions stored in the memory for enabling the computer system under control of the processor, to receive the packet from a Network Interface Card (NIC), determine a Media Access Control (MAC) client to forward the packet to, if the MAC client is a link aggregation control software, forward the packet to the link aggregation control software through a client interface associated a MAC service module, forward the packet to the MAC service module from the link aggregation control software to the MAC service module through a provider interface associated with the MAC service module, determine the MAC client to forward the packets to, wherein the MAC client is not the link aggregation control software, and forward the packet to the MAC client if the MAC client is not the link aggregation control software.

In general, in one aspect, the invention relates to a computer readable medium for sending a packet, comprising software instructions to receive the packet from a Media Access Control (MAC) client, determine a port to send the packet to using the MAC service module, if the port is a virtual port forward the packet to a link aggregation control software, choose a hardware port associated with a Network Interface Card (NIC) to process the packet, wherein the NIC is associated with an aggregation group, forward the packet to the hardware port associated with the NIC using the MAC service module, wherein the packet is forwarded to the MAC service module through a client interface associated with the MAC service module, and if the port is a hardware port forward the packet to the hardware port associated with the NIC through a provider interface associated with the MAC service module.

A computer readable medium for receiving a packet, comprising software instructions to receive the packet from a Network Interface Card (NIC), determine a Media Access Control (MAC) client to forward the packet to, if the MAC client is a link aggregation control software, forward the packet to the link aggregation control software through a client interface associated a MAC service module, forward the packet to the MAC service module from the link aggregation control software to the MAC service module through a provider interface associated with the MAC service module, determine the MAC client to forward the packets to, wherein the MAC client is not the link aggregation control software, and forward the packet to the MAC client if the MAC client is not the link aggregation control software.

In general, in one aspect, the invention relates to a computer readable medium comprises software instructions to instantiate a network interface card (NIC) aggregation framework, wherein the NIC aggregation framework comprises a plurality of providers each configured to publish at least one port, a MAC client configured to send a packet to the at least one port, and a media access control (MAC) service module configured to map the at least one port to one of the plurality of providers, wherein the MAC service module comprises a client interface configured to interface with the MAC client and a provider interface configured to interface with each of the plurality of providers.

In general, in one aspect, the invention relates to a plurality of nodes, comprising a plurality of providers each configured to publish at least one port, a MAC client configured to send a packet to the at least one port, and a media access control (MAC) service module configured to map the at least one port to one of the plurality of providers, wherein the MAC service module comprises a client interface configured to interface with the MAC client and a provider interface configured to interface with each of the plurality of providers, wherein the each of the plurality of providers is located on at least one node of the plurality of nodes, wherein the MAC client is located on at least one node of the plurality of nodes, wherein the MAC service module is located on at least one of the plurality of nodes.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency. In the following detailed description of embodiments of the invention, numerous specific details are set forth in order to provide a more thorough understanding of the invention. In other instances, well-known features have not been described in detail to avoid obscuring the invention.

In general, embodiments of the invention relate to a method and system for a network interface card (NIC) aggregation framework. More specifically, embodiments of the invention provide a NIC aggregation framework that enables resources exposed by NICs in one or more aggregation groups to be controlled by upper layers of the networking stack (e.g., the Internet Protocol (IP) stack, the Transmission Control Protocol (TCP) stack, etc.). Further, embodiments of the NIC aggregation framework may be used with existing networking infrastructures that do not use NIC aggregation. Further, embodiments of the invention provide a NIC aggregation framework that allows the upper layers of the networking stack to manage individual resources of the individual NICs within the aggregation group while allowing the aggregation group to be abstracted as a single virtual NIC.

Figure 1:
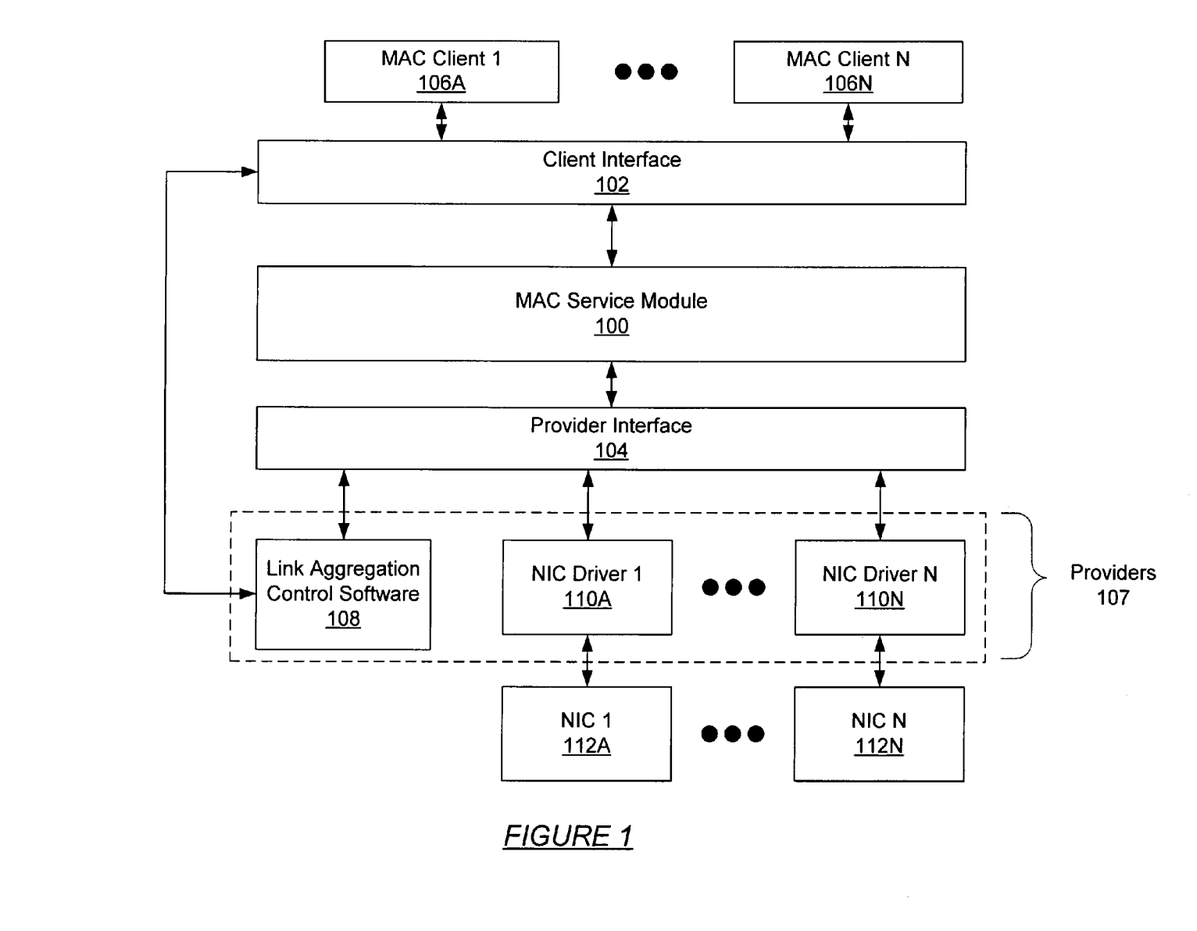
FIG. 1 shows a system in accordance with one embodiment of the invention.

FIG. 1 shows a system in accordance with one embodiment of the invention. The system includes a media access control (MAC) service module (100). The MAC service module (100) typically includes functionality to receive one or more packets from one or more MAC clients (MAC client 1 (106A), MAC client N (106N)). In one embodiment of the invention, the MAC client (MAC client 1 (106A), MAC client N (106N)) corresponds to any process that includes functionality to send and/or receive packets. For example, the MAC client (MAC client 1 (106A), MAC client N (106N)) may correspond to a process executing in a kernel (not shown) of a system on which the MAC service module (100) is executing. Further, the MAC client (MAC client 1 (106A), MAC client N (106N)) may also serve as a bridge between processes executing inside or outside the kernel as the MAC service module (100). The MAC service module (100) also includes functionality to forward one or more packets received from one or more MAC clients (MAC client 1 (106A), MAC client N (106N)) to the appropriate provider (107). In addition, the MAC service module (100) includes functionality to forward one or more packets received from one or more providers (107) to the appropriate MAC client (MAC client 1 (106A), MAC client N (106N)).

In one embodiment of the invention, the MAC client (MAC client 1 (106A), MAC client N (106N)) interfaces with the MAC service module (100) via a client interface (102). The client interface (102) enables MAC clients (MAC client 1 (106A), MAC client N (106N)) to use the resources provided by one or more NICs (112A), NIC N (112N)) without requiring the MAC clients (MAC client 1 (106A), MAC client N (106N)) to have any knowledge of the implementation dependencies of the resources provided by one or more NICs (112A), NIC N (112N)). In one embodiment of the invention, the client interface (102) exposes function entry points that may be used to start a NIC (NIC 1 (112A), NIC N (112N)), stop the NIC (NIC 1 (112A), NIC N (112N)), receive data from the NIC (NIC 1 (112A), NIC N (112N)), transmit data from the NIC (NIC 1 (112A), NIC N (112N)), etc.

In one embodiment of the invention, the MAC service module (100) interfaces with one or more providers (107) via a provider interface (104). In one embodiment of the invention, the provider interface (104) enables one or more providers (107) to register with the MAC service module (100). Further, providers (107) may use the provider interface (104) to register function entry points associated with one or more NICs (NIC 1 (112A), NIC N (112N)) controlled by the providers (107). These function entry points may be used by the MAC service module (100) to service the requests of the various MAC clients (MAC client 1 (106A), MAC client N (106N)). In addition, the provider interface (104) may enable the providers (107) to register the resources (e.g., resource implemented in NIC such as a first-in first-out (FIFO) queue, etc.) provided by the particular provider (107).

In one embodiment of the invention, the provider (107) is a NIC driver (NIC driver 1 (100A), NIC driver N (110N)). The NIC driver (NIC driver 1 (110A), NIC driver N (110N)) corresponds to software used to control the NICs (NIC 1 (112A), NIC N (112N)) (i.e., the NIC driver may implement the function entry points provided to the MAC clients via the client interface). More specifically, the NIC driver (NIC driver 1 (110A), NIC driver N (110N)) includes functionality to expose the resources provided by a particular NIC (NIC 1 (112A), NIC N (112N)). Thus, when the provider (107) is a NIC driver (NIC driver 1 (110A), NIC driver N (110N)), the NIC driver (NIC driver 1 (110A), NIC driver N (110N)) may register each port that the corresponding NIC (NIC 1 (112A), NIC N (112N)) implements. Further, the NIC driver (NIC driver 1 (110A), NIC driver N (110N)) may also register resources (e.g., resource implemented in NIC such as a first-in first-out (FIFO) queue, etc.) used by the particular NIC (NIC 1 (112A), NIC N (112N)) to send and/or receive data.

In one embodiment of the invention, the provider (107) corresponds to link aggregation control software (108). In one embodiment of the invention, the link aggregation control software (108) includes the necessary functionality to support an aggregation group (i.e., a group of one or more NICs). This functionality may include functionality to send packets to and receive packets from the MAC service client (100). Further, the link aggregation control software (108) includes functionality to send packets to one or more NICs (NIC 1 (112A), NIC N (112N)) interfacing with the MAC service module (100). The functionality to send packets to one or more NICs (112A), NIC N (112N)) typically includes functionality to select a particular NIC (112A), NIC N (112N)) to process one or more packets.

In one embodiment of the invention, the link aggregation control software (108) includes two or more NIC selection algorithms (i.e., algorithms used to determine which NIC (e.g., NIC 1 (112A), NIC N (112N)) within the aggregation group to use to service the packet. In one embodiment of the invention, the NIC selection algorithm uses the media access control (MAC) address of the destination system to determine the NIC (e.g., NIC 1 (112A), NIC N (112N)) to use to service the packet. The aforementioned NIC selection algorithm is typically used in network topologies where a server hosting the link aggregation group (106) is operatively connected to a switch (not shown) and is sending the packet to multiple receiving systems.

In one embodiment of the invention, the NIC selection algorithm uses protocol information within the packet to determine which NIC in the aggregation group to use for servicing the packet. The protocol information corresponds to information in one or more fields in the packet. The fields are governed by the protocol (e.g., TCP/IP, etc.) used to format the packet. If the packet is formatted using TCP/IP, the protocol information may correspond to a source port or a destination port. The aforementioned NIC selection algorithm is typically used in network topologies where a server hosting the MAC service module (100) is directly connected to another server (not shown) via the aggregation group. Those skilled in the art will appreciate that the invention is not limited to the two aforementioned NIC selection algorithms described above and that other NIC selection algorithms are possible. In one embodiment of the invention, the link aggregation module (104) includes functionality to implement any given NIC selection algorithm to select the NIC (e.g., NIC 1 (112A), NIC N (112N)) in the aggregation group (106) to use for servicing the packet.

In one embodiment of the invention, the link aggregation control software (108) registers a virtual port with the MAC service module (100) for each aggregation group controlled by the link aggregation control software (108). Further, the link aggregation control software (108) registers one or more virtual resources for each aggregation group controlled by the link aggregation control software (108). The virtual resources typically correspond to resources provided by at least one NIC (e.g., NIC 1 (112A), NIC N (112N)) in the aggregation group.

In addition to operating as a provider (107), the link aggregation control software (108) may also operate as a MAC client. More specifically, the link aggregation control software (108) includes functionality to control the NICs (e.g., NIC 1 (112A), NIC N (112N)) in one or more aggregation groups via the client interface (102). Thus, the link aggregation control software (108) uses the functionality of the MAC services module (100) to control the NICs (e.g., NIC 1 (112A), NIC N (112N)) in one or more aggregation groups. Accordingly, the NIC drivers (NIC driver 1 (110A), NIC driver N (110N)) do not need to be modified to interface with the link aggregation control software (108).

Figure 2:
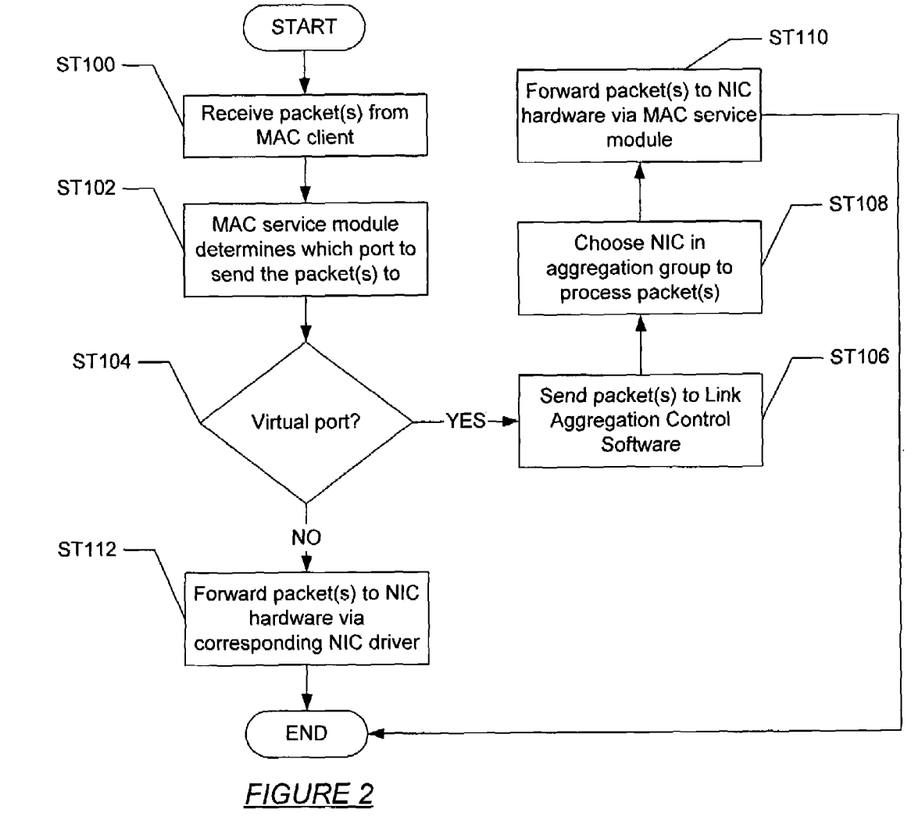
FIGS. 2 and 3 show a flow chart in accordance with one embodiment of the invention.

FIG. 2 shows a flow chart for sending a packet in accordance with one embodiment of the invention. Initially, one or more packets are received by a MAC service module from a MAC client via a client interface of the (ST100). The MAC service module subsequently analyses the packet(s) and determines which port to send the packet(s) to (ST102). As noted above, the ports are associated with particular NICs (or link aggregation control software) and are registered with the MAC service module. A determination is then made whether the port selected by the MAC service module is a virtual port (ST104). Note that the actual determination of whether the port is a virtual port is performed transparently with respect to the MAC service module. If the port is a virtual port, then the packet(s) are forwarded to the link aggregation control software (ST106). The link aggregation control software subsequently chooses one or more NICs in the aggregation group associated with the link aggregation control software to process the packet(s) (ST108). Note that the link aggregation control software may use one of the aforementioned NIC selection algorithms to select the one or more NICs to process the packet(s).

Once the appropriate NIC from the aggregation group is selected, the link aggregation control software forwards the packet(s) to the NIC via the MAC service module (ST110). More specifically, once the appropriate NIC has been selected, the link aggregation control software assumes the role of a MAC client and forwards the packet(s) to the MAC service module via the client interface. The MAC service module subsequently forwards the packets to the appropriate NIC (as determined in ST108). Those skilled in the art will appreciate that the MAC service module enables the link aggregation control software to select one or more NICs to forward the packet(s) to.

Alternatively, if the MAC service module determines that the port is not a virtual port (ST104), the MAC service module forwards the packet(s) to the appropriate hardware port (i.e., a port implemented by a NIC) (ST112). More specifically, MAC service module forwards the packet(s) via the provider interface to the appropriate NIC driver. The NIC driver subsequently forwards the packet to the NIC.

Figure 3:
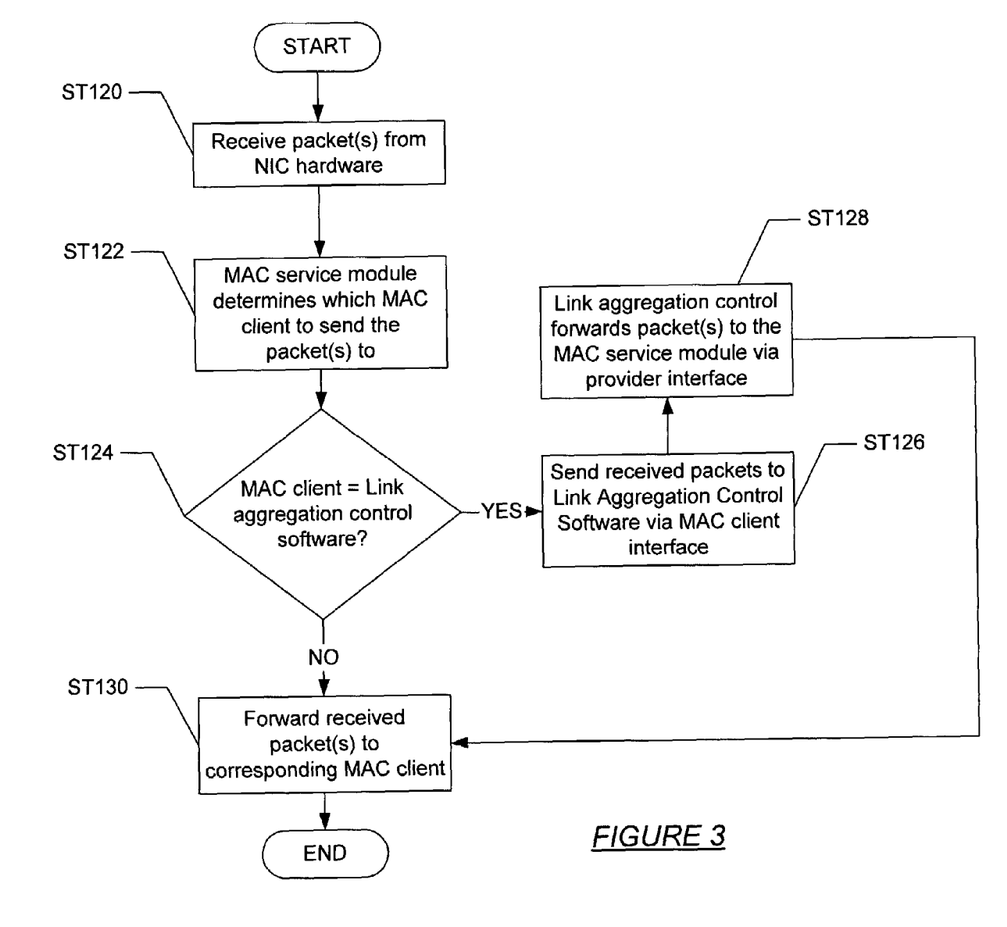

FIG. 3 shows a flowchart for receiving a packet in accordance with one embodiment of the invention. Initially, one or more packets are received by NIC hardware (i.e., a NIC) (ST120). A MAC service module subsequently receives the packet(s) (via the corresponding NIC driver and provider interface), analyzes the packets, and determines which MAC client to send the packet(s) to (ST122). A determination is then made whether the MAC client is the link aggregation control software (ST124). The determination of whether the MAC client is the link aggregation control software is performed transparently within the MAC service module. More specifically, the MAC service module interacts with the link aggregation control software the same as it does with any other MAC client.

If the MAC service module determines that the packet(s) are to be forwarded to the link aggregation control software, the packet(s) are forwarded to the link aggregation control software via the client interface (ST126). The link aggregation control software subsequently receives the packet(s) and forwards the packet(s) to the MAC service module via the provider interface (ST128). In one embodiment of the invention, the link aggregation control software may process the packet(s) prior to forwarding the packets to the MAC service module. Once the packets are received at the MAC service module via the provider interface from either the link aggregation control software, the MAC service module forwards the packet(s) to the MAC client (ST130). In one embodiment of the invention, once the packet(s) are received from the link aggregation control software (via the provider interface), the MAC service module includes the necessary functionality to determine the MAC client (i.e., a MAC client other than the link aggregation control software) to forward the packet(s) to. Alternatively, if the MAC client is not the link aggregation control software (ST124), then the MAC service module forwards the packet(s) to the MAC client via the client interface (ST130).

Figure 4:
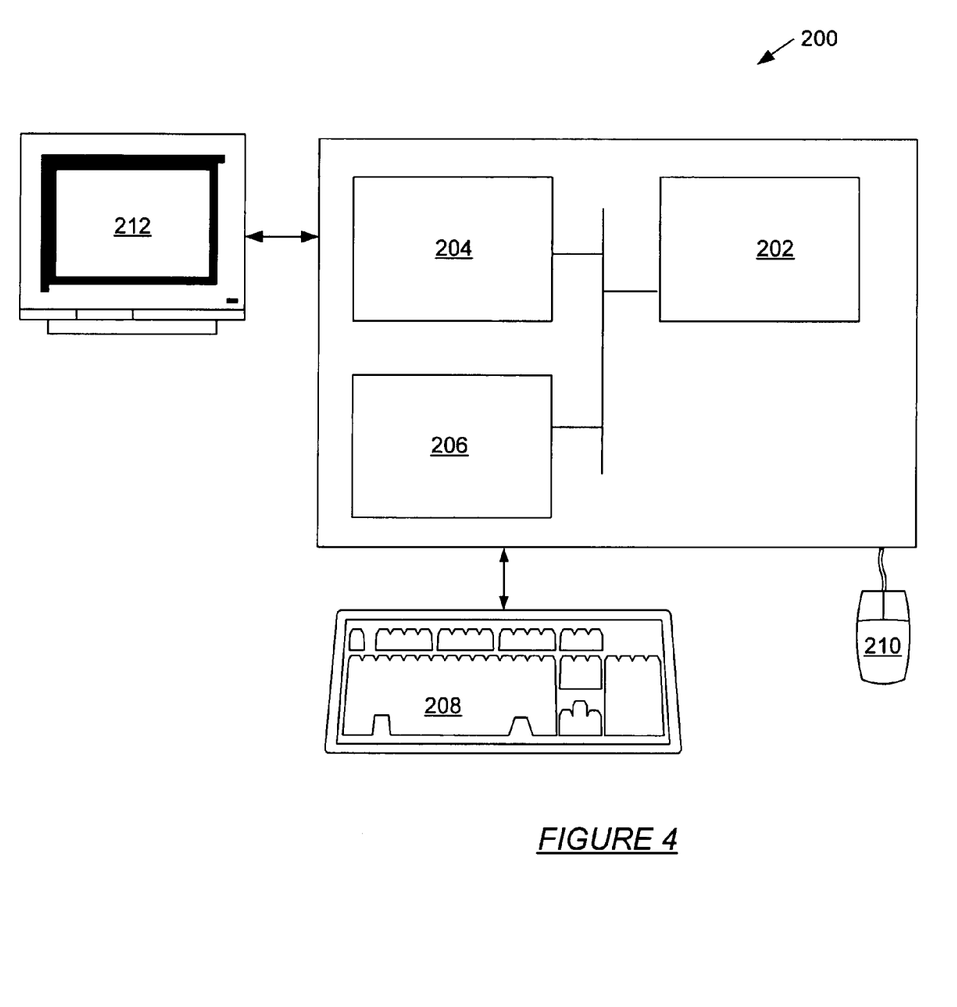
FIG. 4 shows a computer system in accordance with one embodiment of the invention.

The invention may be implemented on virtually any type of computer regardless of the platform being used. For example, as shown in FIG. 4, a computer system (200) includes a processor (202), associated memory (204), a storage device (206), and numerous other elements and functionalities typical of today's computers (not shown). The computer (200) may also include input means, such as a keyboard (208) and a mouse (210), and output means, such as a monitor (212). The computer system (200) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (200) may be located at a remote location and connected to the other elements over a network. Further, the invention may be implemented on a distributed system having a plurality of nodes, where each portion of the invention (e.g., the client, the link aggregation module, the aggregation group, etc.) may be located on a different node within the distributed system. In one embodiment of the invention, the node corresponds to a computer system. Alternatively, the node may correspond to a processor with associated physical memory. Further, software instructions to perform embodiments of the invention may be stored on a computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A network interface card (NIC) aggregation framework, comprising:
   a first provider configured to publish a first port, wherein the first port is associated with a first NIC;
   a second provider configured to publish a second port, wherein the second port is associated with a second NIC;
   a third provider configured to publish a third port, where the third port is a virtual port and wherein the third provider is link aggregation control (LAC) software;
   a MAC client configured to send a packet to the third port;
   a provider interface operatively connected to a media access control (MAC) service module and interposed between the first provider, the second provider, and the third provider and the MAC service module;
   a client interface, operatively connected to the MAC service module interposed between the MAC client and the MAC service module; and
   the media access control (MAC) service module configured to:
      interface with the first provider, the second provider and the third provider using the provider interface,
      interface with the MAC client using the client interface,
      send the packet to the LAC software using the provider interface, wherein the LAC software is configured to select the first provider from a group consisting of the first NIC and the second NIC using a NIC selection algorithm and send the packet to the MAC service module using the client interface, and
      send the packet to the first provider upon receipt from the LAC software, wherein the MAC service module receives the packet from the LAC software using the client interface and sends the packet to the first provider using the provider interface.

2. The system of claim 1, wherein the first provider is a NIC driver.

3. The system of claim 1, wherein the provider interface enables the first provider, the second provider, and the third provider to register with the MAC service module.

4. The system of claim 1, wherein the client interface is configured to expose a function entry point to the MAC client, wherein the function entry point enables the MAC client to use at least one of the first provider, the second provider, and the third provider.

5. A method for sending a packet, comprising:
   receiving the packet from a Media Access Control (MAC) client using a client interface;
   determining at least one virtual port to send the packet to using a MAC service module;
   forwarding the packet to a link aggregation control (LAC) software using a provider interface, wherein the LAC software is associated with the at least one virtual port, and wherein the LAC software is associated with a first provider registered with the MAC service module;
   choosing, by the LAC software, a hardware port associated with a Network Interface Card (NIC) to process the packet, wherein the NIC is associated with an aggregation group; and
   forwarding the packet to the hardware port associated with the NIC using the MAC service module, wherein the packet is forwarded to the MAC service module through the client interface associated with the MAC service module, wherein the MAC service modules forwards the packet to the NIC through the provider interface, wherein the NIC is associated with a second provider registered with the MAC service module.

6. The method of claim 5, wherein forwarding the packet to the hardware port associated with the NIC comprises forwarding the packet to a NIC driver associated with the NIC, wherein the NIC driver receives the packet from the provider interface.

7. The method of claim 5, wherein the link aggregation control software is configured to publish the at least one virtual port associated with an aggregation group.

8. The method of claim 6, wherein the link aggregation control software is configured to map the at least one virtual port to at least one of the plurality of providers, wherein the at least one of the plurality of providers is not the link aggregation control software.

9. The method of claim 6, wherein the aggregation group comprises at least one NIC.

10. The method of claim 5, wherein the link aggregation control software is configured to publish at least one virtual resource associated with an aggregation group.

11. A method for receiving a packet comprising:
   receiving the packet from a Network Interface Card (NIC) by a MAC service module;
   determining a first Media Access Control (MAC) client to forward the packet to by the MAC service module, wherein the first MAC client is a link aggregation control software;
   forwarding the packet to the link aggregation control (LAC) software through a client interface associates the MAC service module, wherein the LAC software is a virtual port, and wherein the LAC software is associated with a first provider registered with the MAC service module;
   forwarding the packet to the MAC service module from the link aggregation control software through the provider interface associated with the MAC service module, wherein the LAC software is configured to operate as the first MAC client and a provider; and
   determining a second MAC client to forward the packets to, wherein the second MAC client is not the link aggregation control software.

12. The method of claim 11, wherein the packet is received from the NIC through the provider interface.

13. A computer system for sending a packet, comprising:
   a processor;
   a memory;
   a storage device; and
   software instructions stored in the memory for enabling the computer system under control of the processor, to:
      receive the packet from a Media Access Control (MAC) client using a client interface;
      determine at least one virtual port to send the packet to using a MAC service module;
      forward the packet to a link aggregation control (LAC) software using a provider interface, wherein the LAC software is associated with the at least one virtual port, and wherein the LAC software is associated with a first provider registered with the MAC service module;
      choose, by the LAC software, a hardware port associated with a Network Interface Card (NIC) to process the packet, wherein the NIC is associated with an aggregation group; and
      forward the packet to the hardware port associated with the NIC using the MAC service module, wherein the packet is forwarded to the MAC service module through the client interface associated with the MAC service module, wherein the MAC service modules forwards the packet to the NIC through the provider interface, wherein the NIC is associated with a second provider registered with the MAC service module.

14. A computer system for receiving a packet, comprising:
   a processor;
   a memory;
   a storage device; and
   software instructions stored in the memory for enabling the computer system under control of the processor, to:
      receiving the packet from a Network Interface Card (NIC) by a MAC service module;
      determining a first Media Access Control (MAC) client to forward the packet to by the MAC service module wherein the first MAC client is a link aggregation control software;
      forward the packet to the link aggregation control (LAC) software through a client interface associates the MAC service module, wherein the LAC software is a virtual port, and wherein the LAC software is associated with a first provider registered with the MAC service module;
      forward the packet to the MAC service module from the link aggregation control software through the provider interface associated with the MAC service module, wherein the LAC software is configured to operate as the first MAC client and a provider; and
      determine a second MAC client to forward the packets to, wherein the MAC client is not the link aggregation control software.

15. A computer readable medium for sending a packet, encoded with software instructions executable by a processor, to:
   receive the packet from a Media Access Control (MAC) client using a client interface;
   determine at least one virtual port to send the packet to using a MAC service module;
   forward the packet to a link aggregation control (LAC) software using a provider interface, wherein the LAC software is associated with the at least one virtual port, and wherein the LAC software is associated with a first provider registered with the MAC service module,
   choose, by the LAC software, a hardware port associated with a Network Interface Card (NIC) to process the packet, wherein the NIC is associated with an aggregation group; and
   forward the packet to the hardware port associated with the NIC using the MAC service module, wherein the packet is forwarded to the MAC service module through the client interface associated with the MAC service module, wherein the MAC service modules forwards the packet to the NIC through the provider interface, wherein the NIC is associated with a second provider registered with the MAC service module.

16. A computer readable medium for receiving a packet, encoded with software instructions executable by a processor, to:
   receive the packet from a Media Access Control (MAC) client using a client interface;
   determine at least one virtual port to send the packet to using a MAC service module;
   forward the packet to a link aggregation control (LAC) software using a provider interface, wherein the LAC software is associated with the at least one virtual port, and wherein the LAC software is associated with a first provider registered with the MAC service module;
   choose, by the LAC software, a hardware port associated with a Network Interface Card (NIC) to process the packet, wherein the NIC is associated with an aggregation group; and
   forward the packet to the hardware port associated with the NIC using the MAC service module, wherein the packet is forwarded to the MAC service module through the client interface associated with the MAC service module, wherein the MAC service modules forwards the packet to the NIC through the provider interface, wherein the NIC is associated with a second provider registered with the MAC service module.

17. A computer readable medium encoded with software instructions executable by a processor to instantiate a network interface card (NIC) aggregation framework, wherein the NIC aggregation framework comprises:
- a first provider configured to publish a first port, wherein the first port is associated with a first NIC;
- a second provider configured to publish a second port, wherein the second port is associated with a second NIC;
- a third provider configured to publish a third port, where the third port is a virtual port and wherein the third provider is link aggregation control (LAC) software;
- a MAC client configured to send a packet to the third port;
- a provider interface operatively connected to a media access control (MAC) service module and interposed between the first provider, the second provider, and the third provider and the MAC service module;
- a client interface, operatively connected to the MAC service module interposed between the MAC client and the MAC service module; and
- the media access control (MAC) service module configured to:
  - interface with the first provider, the second provider and the third provider using the provider interface,
  - interface with the MAC client using the client interface,
  - send the packet to the LAC software using the provider interface, wherein the LAC software is configured to select the first provider from a group consisting of the first NIC and the second NIC using a NIC selection algorithm and send the packet to the MAC service module using the client interface, and
  - send the packet to the first provider upon receipt from the LAC software, wherein the MAC service module receives the packet from the LAC software using the client interface and sends the packet to the first provider using the provider interface.

18. A plurality of nodes, comprising:
- a first provider configured to publish a first port, wherein the first port is associated with a first NIC;
- a second provider configured to publish a second port, wherein the second port is associated with a second NIC;
- a third provider configured to publish a third port, where the third port is a virtual port and wherein the third provider is link aggregation control (LAC) software;
- a MAC client configured to send a packet to the third port;
- a provider interface operatively connected to a media access control (MAC) service module and interposed between the first provider, the second provider, and the third provider and the MAC service module;
- a client interface, operatively connected to the MAC service module interposed between the MAC client and the MAC service module; and
- the media access control (MAC) service module configured to:
  - interface with the first provider, the second provider and the third provider using the provider interface,
  - interface with the MAC client using the client interface,
  - send the packet to the LAC software using the provider interface, wherein the LAC software is configured to select the first provider from a group consisting of the first NIC and the second NIC using a NIC selection algorithm and send the packet to the MAC service module using the client interface, and
  - send the packet to the first provider upon receipt from the LAC software, wherein the MAC service module receives the packet from the LAC software using the client interface and sends the packet to the first provider using the provider interface;
- wherein the each of the first provider, the second provider, and the third provider is located on at least one node of the plurality of nodes;
- wherein the MAC client is located on at least one node of the plurality of nodes;
- wherein the MAC service module is located on at least one of the plurality of nodes.

* * * * *

UNITED STATES PATENT AND TRADEMARK OFFICE
CERTIFICATE OF CORRECTION

PATENT NO. : 7,616,653 B1
APPLICATION NO. : 10/932978
DATED : November 10, 2009
INVENTOR(S) : Nicolas G. Droux et al.

Page 1 of 1

It is certified that error appears in the above-identified patent and that said Letters Patent is hereby corrected as shown below:

In Claim 8, Column 9 (line 1), please replace "claim 6" with --claim 7--;

In Claim 9, Column 9 (line 6), please replace "claim 6" with --claim 7--.

Signed and Sealed this

Twelfth Day of January, 2010

David J. Kappos
*Director of the United States Patent and Trademark Office*